United States Patent
Kahl et al.

(10) Patent No.: US 10,220,884 B2
(45) Date of Patent: Mar. 5, 2019

(54) COWL COVER ARRANGEMENT FOR A MOTOR VEHICLE

(71) Applicant: Bayerische Motoren Werke Aktiengesellschaft, Munich (DE)

(72) Inventors: Florian Kahl, Ampermoching (DE); Andreas Huber, Geiselhoering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/784,375

(22) Filed: Oct. 16, 2017

(65) Prior Publication Data

US 2018/0037271 A1 Feb. 8, 2018

Related U.S. Application Data

(63) Continuation of application No. PCT/EP2016/058333, filed on Apr. 15, 2016.

(30) Foreign Application Priority Data

Apr. 17, 2015 (DE) .................. 10 2015 207 067

(51) Int. Cl.
*B62D 25/24* (2006.01)
*B62D 25/08* (2006.01)
*B60H 1/28* (2006.01)

(52) U.S. Cl.
CPC ............ *B62D 25/24* (2013.01); *B60H 1/28* (2013.01); *B62D 25/081* (2013.01)

(58) Field of Classification Search
CPC ......... B62D 25/081; B62D 25/24; B60H 1/28

USPC ........................................................ 296/192
See application file for complete search history.

(56) References Cited

U.S. PATENT DOCUMENTS

| | | | |
|---|---|---|---|
| 2012/0187723 A1* | 7/2012 | Bergholtz | B60H 1/28 296/192 |
| 2014/0017987 A1* | 1/2014 | Andersson | B60H 1/28 454/147 |
| 2015/0015030 A1* | 1/2015 | Sasaki | B62D 25/081 296/192 |

(Continued)

FOREIGN PATENT DOCUMENTS

| | | |
|---|---|---|
| DE | 43 13 783 C1 | 8/1994 |
| DE | 10 2014 201 675 A1 | 9/2014 |
| DE | 10 2013 012 483 A1 | 1/2015 |

(Continued)

OTHER PUBLICATIONS

International Search Report (PCT/ISA/210) issued in PCT Application No. PCT/EP2016/058333 dated Jul. 14, 2016 with English translation (Four (4) pages).

(Continued)

*Primary Examiner* — Jason S Morrow
(74) *Attorney, Agent, or Firm* — Crowell & Moring LLP

(57) ABSTRACT

A cowl cover arrangement for a motor vehicle has a cowl cover which adjoins a lower end of a front pane and extends in the direction of a width of the motor vehicle. The cowl cover arrangement further has a first wall for collecting water flowing from the front pane over the cowl cover. The cowl cover arrangement further has a second wall for collecting water flowing over or through the first wall. At least one water outlet discharges the water collected by the second wall.

12 Claims, 1 Drawing Sheet

(56) References Cited

U.S. PATENT DOCUMENTS

2016/0375844 A1* 12/2016 Kempfer ................ B60R 13/07
                                                                                    296/192

FOREIGN PATENT DOCUMENTS

| | | |
|---|---|---|
| DE | 20 2013 008 973 U1 | 2/2015 |
| DE | 10 2013 017 183 A1 | 4/2015 |
| EP | 0 301 494 B1 | 3/1991 |
| EP | 2 594 462 A1 | 5/2013 |
| JP | 2010-125991 A | 6/2010 |
| JP | 2001278117 A * | 6/2018 |
| WO | WO 2014/196745 A1 | 12/2014 |

OTHER PUBLICATIONS

German-language Written Opinion (PCT/ISA/237) issued in PCT Application No. PCT/EP2016/058333 dated Jul. 14, 2016 (Five (5) pages).

German-language Search Report issued in counterpart German Application No. 10 2015 207 067.0 dated Feb. 2, 2016 with partial English translation (Fourteen (14) pages).

\* cited by examiner

COWL COVER ARRANGEMENT FOR A MOTOR VEHICLE

CROSS REFERENCE TO RELATED APPLICATIONS

This application is a continuation of PCT International Application No. PCT/EP2016/058333, filed Apr. 15, 2016, which claims priority under 35 U.S.C. § 119 from German Patent Application No. 10 2015 207 067.0, filed Apr. 17, 2015, the entire disclosures of which are herein expressly incorporated by reference.

BACKGROUND AND SUMMARY OF THE INVENTION

The present invention relates to a cowl cover arrangement for a motor vehicle, having a cowl cover, which adjoins a lower end of a front pane and extends in the direction of a width of the motor vehicle.

By way of example, DE 102013012483 A1 discloses a water deflector for a windshield of a motor vehicle. This windshield is adjoined by a drain body, which can also be referred to as a cowl cover. The drain body is a component part of the water deflector and is formed with a trough portion, with a through-opening serving as a water drain being formed in the trough-like depression.

DE 202013008973 U1 also discloses a water discharge system for carrying water away from a windshield, said system adjoining a lower end of the windshield. The water deflector has a channel element for receiving water and for carrying water away. An air inlet grille for the intake of air is located downstream of the water deflector, underneath a front flap. In order to prevent water from passing over the water deflector into the air intake region, the deflector has a relatively high design, and requires a corresponding amount of installation space in a vertical direction of the vehicle.

It is the object of the present invention to provide a cowl cover arrangement for a motor vehicle, having a cowl cover, which requires a smaller amount of installation space in a vertical direction of the vehicle and nevertheless can carry away a sufficiently large quantity of water.

This and other objects are achieved by a cowl cover arrangement in accordance with embodiments of the invention.

In particular, a cowl cover arrangement for a motor vehicle has a cowl cover, which adjoins a lower end of a front pane and extends in the direction of a width of the motor vehicle. The cowl cover arrangement furthermore has a first wall for collecting water flowing away from the front pane over the cowl cover. Furthermore, the cowl cover arrangement has a second wall for collecting water flowing over and/or through the first wall. At least one water drain is provided for carrying away the water collected by the second wall. Furthermore, an air intake opening of an interior compartment ventilation device is preferably arranged downstream of the second wall, and a water collecting and water drain region is arranged upstream of the second wall. The directional expressions "downstream of" and "upstream of" refer here to a water flow direction or a direction of air flowing to the air intake opening. The water flow direction or the air flow direction is substantially opposite to a main direction of travel of the vehicle.

By arranging the first wall and the second wall in succession, a comparatively good water collecting performance can nevertheless be achieved given a relatively small wall height. The required installation space in the vertical direction of the vehicle is therefore reduced.

The first wall forms, in particular, a boundary of a first water collecting region. The second wall forms, in particular, a boundary of a second water collecting region (and also water drain region).

It is preferable that the first wall or the second wall is formed integrally with the cowl cover. It is also possible for both the first wall and the second wall to be formed integrally with the cowl cover. This reduces the number of components and the number of sealing points.

In particular, the first wall and/or the second wall can be formed integrally with the cowl cover by way of plastics injection molding. A plastics injection-molded part can be produced cost-effectively, is sufficiently lightweight, and also resistant to external weathering influences.

In principle, the second wall can be formed so as to be higher than the first wall. This is advantageous in particular when the cowl cover is formed obliquely, i.e. sloping forward. Here, the first wall can be used to collect a first quantity of water, it being ensured that water flowing over or flowing through the first wall can be collected in any case by way of the second wall, which is higher. A water collecting capacity of the second wall is thus greater than a water collecting capacity of the first wall.

According to a preferred development, a further water drain for carrying away the water collected by the first wall is provided. As an alternative or in addition, a through-hole can also be arranged at a suitable location in a lower portion of the first wall, it being possible for the through-hole to conduct through-flowing water over a short distance to the water drain for carrying away the water collected by the second wall, without significantly impairing a water collecting capacity of the second wall.

According to a preferred development, in the cowl cover arrangement, the first wall and the second wall are arranged between the cowl cover and a closed front flap of the motor vehicle. In other words, the first wall and the second wall are arranged underneath the closed front flap.

Furthermore, the first wall and the second wall are preferably located in an intake region for air to the air intake opening. As a result, the water collecting capacity of the first wall and of the second wall can reliably prevent a situation in which excess water and moisture is conducted or taken in together with the air to the interior compartment ventilation device. In this case, a gap, which is a component part of the intake region for air, can be formed between a bottom side of the closed front flap and an upper end of the first wall. In other words, air for an interior compartment ventilation device can be taken in through said gap.

Furthermore, in addition or as an alternative, a gap, which is a component part of the intake region for air, can be formed between a bottom side of the closed front flap and an upper end of the second wall. It is thus possible for air to be taken in via the first wall and via the second wall, the second wall preventing a situation in which water possibly carried along or overflowing water passes into the interior compartment ventilation device, since said water can be captured reliably by the second wall.

Instead of the gap between the first wall and the front flap, or between the second wall and the front flap, it is also possible for holes to be formed in an upper portion of the respective wall, through which holes the air can be taken in.

It is also possible that both a gap and also additionally holes are arranged in an upper portion of the respective wall.

Furthermore, the first wall can advantageously make contact, with sealing action, with a bottom side of the closed front flap. In this case, holes for the intake of air have to be formed in an upper portion of the first wall.

The second wall, too, could be formed in such a manner that it makes contact, in particular with sealing action, with a bottom side of the front flap. In this case, too, holes would then necessarily have to be formed in an upper region of the second wall for the intake of air.

Through the configuration with two walls arranged in succession in the region of the intake region for air to the air intake opening, the connection of two walls in succession means that water can be carried away more effectively, and a situation in which water enters into or is carried along into the air intake opening can be prevented more effectively.

Furthermore, this can create an intake region for air which, in terms of a low pressure loss, runs in the most streamlined manner possible underneath a bottom side of the front flap.

By virtue of the fact that the two water collecting walls are arranged in succession, they can be formed to be smaller, and therefore more installation space is available for the intake region for air, as a result of which a disadvantageous pressure loss can be kept as low as possible.

According to a preferred development of the cowl cover arrangement, the first wall extends substantially in a transverse direction of the vehicle. Similarly, the second wall can extend substantially in a transverse direction of the vehicle. Therefore, the first wall or the second wall is formed substantially transverse to a direction of water flowing away from the front pane, and the water flowing away can be prevented from flowing further and particularly expediently can be carried away.

The first wall and/or the second wall can extend substantially over an entire width of the cowl and/or of the front pane of the motor vehicle. However, the walls can also be arranged merely in the region of an air intake region. A plurality of air intake regions can also be provided.

It is preferable for there to be no air intake opening arranged in the region between the first wall and the second wall, in particular in the cowl cover.

Other objects, advantages and novel features of the present invention will become apparent from the following detailed description of one or more preferred embodiments when considered in conjunction with the accompanying drawings.

DETAILED DESCRIPTION OF THE DRAWINGS

An exemplary embodiment of the present invention is described hereinbelow with reference to FIGS. 1 and 2.

Figure 1:
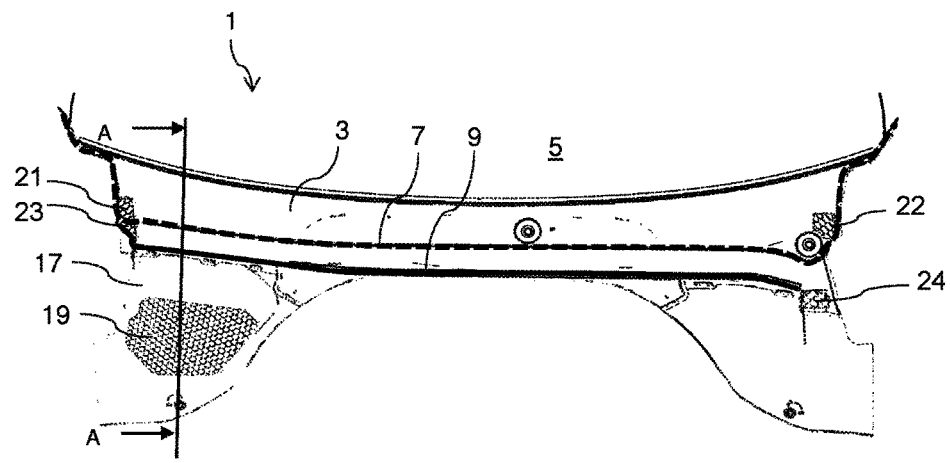
FIG. 1 is a plan view of a cowl cover arrangement of a motor vehicle.

As is shown in FIG. 1, a cowl cover arrangement 1 of a motor vehicle according to the exemplary embodiment of the present invention has a cowl cover 3, which adjoins a lower end (i.e. an end at the front in the main direction of travel of the motor vehicle) of a front pane (windshield) 5. Here, the cowl cover 3 and the front pane 5 are connected to one another via a seal, and conventionally form a merging surface. The majority of the cowl cover 3 is arranged here underneath a closed front flap 13 (hood), which is not shown in FIG. 1. The cowl cover 3 extends substantially over an entire width of the front pane 5. The cowl cover 3 has a first wall 7, which extends transversely to the cowl cover 3 in a width direction of the motor vehicle over the entire width of the cowl cover 3, and is shown in FIG. 1 with a dashed line. The first wall 7 is formed as a wall for capturing and collecting water which flows away from the front pane 5 downward—i.e. forward in the main direction of travel of the motor vehicle. A second wall 9 is arranged downstream of the first wall 7 in the water drain direction, i.e. upstream of the first wall 7 in the main direction of travel of the motor vehicle, and likewise extends transversely to the cowl cover 3 over the entire width of the cowl cover 3 in the width direction of the motor vehicle substantially over an entire width of the front pane 5. The cowl cover 3, with the first wall 7 and the second wall 9, is advantageously formed in one piece as a plastics injection-molded part.

Figure 2:
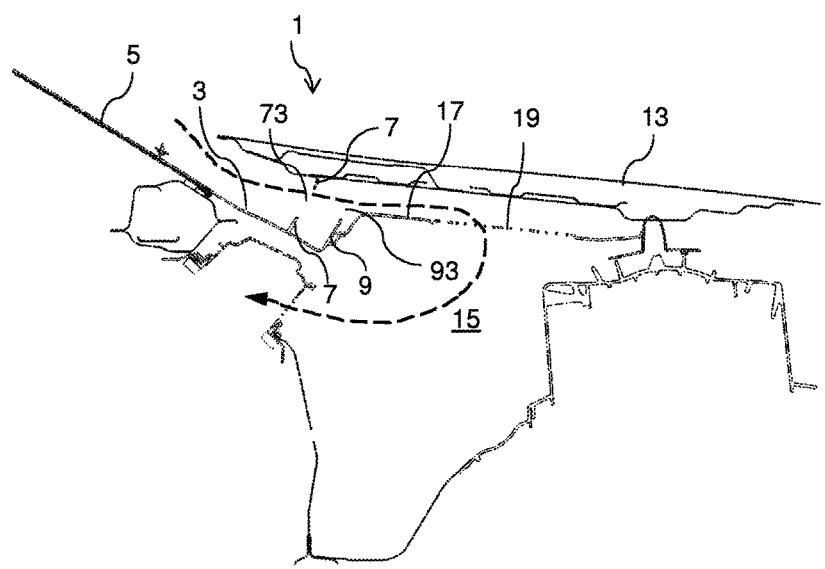
FIG. 2 is a sectional view along line A-A of the cowl cover arrangement according to the exemplary embodiment of the present invention.

Downstream of the cowl cover 3 in the water drain direction, or upstream of the cowl cover 3 in the main direction of travel of the motor vehicle, an air duct 15 is provided, which is shown merely in FIG. 2, for the intake of air for an interior compartment ventilation device (an air-conditioning system or the like). The air duct 15 is covered with a surface element 17, in which there is formed an air intake opening 19 having a plurality of holes 19 arranged in grille-like form. The surface element 17 is formed separately from the cowl cover 3, and adjoins the cowl cover 3 upstream of the second wall 9 in the main direction of travel of the motor vehicle. However, the cowl cover 3 could also be formed in one piece with the surface element 17. Air for the interior compartment ventilation device can pass through the air intake opening 19 into the air duct 15 underneath the surface element 17. The grille-like arrangement of the holes 19, as a protective grille, prevents relatively coarse solids from passing into the air duct 15.

Water drain holes 21 and 22 are provided upstream of the first wall 7, in the water drain direction, at lateral ends of the cowl cover 3. Furthermore, water drain holes 23 and 24 are provided at lateral ends of the cowl cover 3 in the water drain direction. The water drain holes 21, 22, 23 and 24 can also be provided at other suitable locations upstream of the respective wall. The water drain holes 21, 22, 23 and 24 are preferably provided at deep points of the cowl cover 3.

FIG. 2 is a sectional view along line A-A through the cowl cover arrangement 1 according to the exemplary embodiment of the invention in an air intake region for air for the interior compartment ventilation device. As can be seen in FIG. 2, the cowl cover 3 adjoins the lower end of the front pane 5 and is substantially flush therewith. As has already been explained with reference to FIG. 1, it can be seen from FIG. 2 that the first wall 7 and the second wall 9 extend substantially transversely to the cowl cover 3, and in particular are arranged substantially perpendicular to the cowl cover 3. Here, the first wall 7 and the second wall 9 are an integral component part of the cowl cover 3, which is formed as a single-piece component. The first wall 7 extends from a main surface of the cowl cover 3 to a bottom side of the closed front flap 13. Through-holes 73, through which air can be taken in, are provided in an upper portion of the first wall 7. In this case, a large number of through-holes 73 are arranged alongside one another and form a protective grille against the ingress of foliage or other foreign matter into the region downstream of the first wall 7 in the water drain direction. A soft component, for example, can be attached over the through-holes 73 at an upper end of the first wall 7 and bears against the bottom side of the front flap 13, with sealing action, when the front flap 13 is closed. A gap 93, through which the air can be taken in, is formed between an upper end of the second wall 9 and the bottom side of the front flap 13. A foot of the second wall 9 is located at a deeper point than a foot of the first wall 7. Furthermore, the second wall 9 is higher than the first wall 7—at least in relation to the portion of the first wall 7 which has no through-holes.

Hereinbelow, a function of the cowl cover arrangement 1 according to the exemplary embodiment is described.

Water flowing away from the front pane 5, in particular rainwater or washing water, is firstly collected at the first wall 7 of the first water collecting region and carried away via the water drains 21 and 22. In the case of a large quantity of water flowing away from the front pane 5, it is also possible, however, for water to pass through the through-holes 73 and therefore through the first wall 7. The water flowing through the through-holes 73 is collected at the second wall 9, however. By virtue of the oblique arrangement of the main surface of the cowl cover 3, a foot of the second wall 9 is arranged at a deeper point than a foot of the first wall 7, and therefore a second water collecting region upstream of the second wall 9 is arranged at a deeper point than the first water collecting region upstream of the first wall 7. The water collected by the second wall 9 can be carried away by the further water drains 23 and 24. The first wall 7 and the second wall 9 have the purpose of collecting the water flowing away from the front pane 5, and of preventing a situation in which water passes into the air intake opening 19. The first wall 7 and the second wall 9 can also be referred to as baffles.

An air intake region to the air intake opening 19 runs between a downstream end of the front flap 13, as seen in the main direction of travel, and the front pane 5 or the cowl cover 3. Furthermore, the air intake region runs through the through-holes 73 of the first wall 7 and also through the gap 93 between the second wall 9 and the bottom side of the front flap 13. Furthermore, the air intake region runs between the surface element 17 and the bottom side of the front flap 13. The air passes through the air intake opening 19 of the surface element 17 from the air intake region into the air duct 15. The course of the air is illustrated in this case by a dashed arrow in FIG. 2.

The advantages of the invention come into effect in particular when simultaneously a large quantity of water drains from the front pane 5 and air is taken in through the air intake region. By virtue of the two water collecting regions connected in succession upstream of the first wall 7 and the second wall 9, a quantity of water which may have been carried along by the air stream can in this case be reduced gradually and carried away. The surface component 17 downstream of the second wall 9 in this case can additionally contribute to a situation in which water possibly present in the air stream is deposited on the surface component and is not introduced into the air duct 15.

As a whole, the described arrangement according to the exemplary embodiment of the present invention makes it possible for water to be efficiently separated with the lowest possible pressure loss for the air taken in, given a relatively small installation height of the first wall and of the second wall. In other words, the arrangement of the two walls in succession makes it possible to achieve a high water separation capacity even with a small installation space in the vertical direction. Conversely, more installation space may possibly be provided for the air intake region owing to the relatively small installation space of the walls. This, in turn, makes it possible to achieve a lower pressure loss and also lower flow velocities for the air taken in, as a result of which the probability of water being carried along by the air is advantageously reduced.

The exemplary embodiment can also be modified further.

By way of example, it is possible for the second wall to also extend as far as the bottom side of the closed front flap, but like the first wall to have through-holes for the passage of the air taken in. Conversely, it is also possible for an upper end of the first wall not to extend as far as the bottom side of the front flap, and therefore for a gap to be formed between the first wall and the bottom side of the front flap, in order to pass through air. As can be seen in FIG. 2, the second wall is formed so as to be higher than the first wall. The first wall and the second wall can also be formed with the same height. The second wall can also be formed so as to be lower than the first wall.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cowl cover arrangement for a motor vehicle, comprising:
   a cowl cover configured to adjoin a lower end of a front pane of the motor vehicle and extend in a direction of a width of the motor vehicle,
   wherein the cowl cover has a first wall for collecting water flowing away from the front pane over the cowl cover, and a second wall for collecting water flowing over and/or through the first wall;
   an air intake opening of a motor vehicle interior compartment ventilation device is arranged downstream of the second wall; and
   a water collecting and water drain region is arranged upstream of the second wall; and
   at least one water drain that carries away water collected by the second wall.

2. The cowl cover arrangement as claimed in claim 1, wherein
   at least one of the first wall and the second wall is formed integrally with the cowl cover.

3. The cowl cover arrangement as claimed in claim 2, wherein
   the second wall is formed so as to be higher than the first wall.

4. The cowl cover arrangement as claimed in claim 1, wherein
   the second wall is formed so as to be higher than the first wall.

5. The cowl cover arrangement as claimed in claim 1, further comprising:
   a further water drain for carrying away the water collected by the first wall.

6. The cowl cover arrangement as claimed in claim 1, wherein
   the first wall and the second wall are arranged between the cowl cover and a closed front flap of the motor vehicle, and are located in an intake region for air to the air intake opening.

7. The cowl cover arrangement as claimed in claim 6, further comprising at least one of:
   a first gap, which is a component part of the intake region for air, formed between a bottom side of the closed front flap and an upper end of the first wall, and a second gap, which is a component part of the intake region for air, formed between a bottom side of the closed front flap and an upper end of the second wall.

8. The cowl cover arrangement as claimed in claim 6, wherein the first wall makes contact with a bottom side of the closed front flap, and/or the second wall makes contact with a bottom side of the front flap.

9. The cowl cover arrangement as claimed in claim 8, wherein the contact is a sealing action contact.

10. The cowl cover arrangement as claimed in claim 6, wherein an upper portion of the first wall has holes, which are a component part of the intake region for air, and/or an upper portion of the second wall has holes, which are a component part of the intake region for air.

11. The cowl cover arrangement as claimed in claim 1, wherein the first wall and/or the second wall extend substantially in the transverse direction of the vehicle.

12. The cowl cover arrangement as claimed in claim 1, wherein the first wall and/or the second wall extend substantially over an entire width of the cowl or of the front pane of the motor vehicle.

* * * * *